(12) United States Patent
Long

(10) Patent No.: US 11,366,548 B2
(45) Date of Patent: Jun. 21, 2022

(54) TOUCH DISPLAY PANEL AND DISPLAY DEVICE

(71) Applicant: BOE TECHNOLOGY GROUP CO., LTD., Beijing (CN)

(72) Inventor: Chunping Long, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 50 days.

(21) Appl. No.: 16/963,723

(22) PCT Filed: Feb. 7, 2020

(86) PCT No.: PCT/CN2020/074481
§ 371 (c)(1),
(2) Date: Jul. 21, 2020

(87) PCT Pub. No.: WO2020/164438
PCT Pub. Date: Aug. 20, 2020

(65) Prior Publication Data
US 2021/0365143 A1     Nov. 25, 2021

(30) Foreign Application Priority Data

Feb. 14, 2019   (CN) .......................... 201920200963.4

(51) Int. Cl.
*G06F 3/041*      (2006.01)
(52) U.S. Cl.
CPC ........ *G06F 3/0418* (2013.01); *G06F 3/04164* (2019.05)

(58) Field of Classification Search
None
See application file for complete search history.

(56) References Cited

U.S. PATENT DOCUMENTS

| 2014/0167769 A1 | 6/2014 | Kim et al. |
| 2015/0090961 A1 | 4/2015 | Lee |
| 2016/0105952 A1* | 4/2016 | Park ...................... G02F 1/1309 |
| | | 345/174 |
| 2016/0358525 A1* | 12/2016 | Huang .................. G06F 3/0412 |
| 2017/0228074 A1* | 8/2017 | Du ..................... G02F 1/133514 |
| 2018/0329544 A1* | 11/2018 | Yeh ........................ G06F 3/0443 |
| 2019/0005861 A1* | 1/2019 | Huang .................. G06F 3/0416 |

FOREIGN PATENT DOCUMENTS

| CN | 107230443 A | 10/2017 |
| CN | 108335682 A | 7/2018 |
| CN | 209199077 U | 8/2019 |

* cited by examiner

*Primary Examiner* — Krishna P Neupane
(74) *Attorney, Agent, or Firm* — Dinsmore & Shohl LLP

(57) ABSTRACT

A touch display panel is disclosed, which includes components of a conventional touch display panel, and further includes: first leads and first data lines share a first test signal line, second leads and second data lines share a second test signal line: and first touch test switches for controlling the first leads and first data test switches for controlling the first data lines are not simultaneously turned on, second touch test switches for controlling the second leads and second data test switches for controlling the second data lines are not simultaneously turned on.

11 Claims, 5 Drawing Sheets

TOUCH DISPLAY PANEL AND DISPLAY DEVICE

CROSS REFERENCE TO RELATED APPLICATIONS

This application is a U.S. National Stage Application under 35 U.S.C. § 371 of International Patent Application No. PCT/CN2020/074481, filed on Feb. 7, 2020, which claims priority from the Chinese patent application No. 201920200963.4 filed on Feb. 14, 2019, the disclosures of which are incorporated herein by reference in their entirety.

TECHNICAL FIELD

The present disclosure relates to a touch display panel and a display device.

BACKGROUND

At present, built-in touch screens have been applied more and more widely due to their advantages of simple structure, fast response speed and high sensitivity, especially in the occasions with strict volume requirements, such as portable mobile devices. In order to further reduce a size of portable devices, in the prior art, a touch electrode matrix is generally formed by dividing a common electrode layer in a touch operation region into a plurality of small blocks.

In a test structure of a self-capacitance built-in touch screen, a plurality of test signal lines, odd touch electrodes and even touch electrodes are provided, wherein the test signal lines are used to individually provide different test voltage values to corresponding thin film transistors during a test, wherein a portion of the test signal lines provides a high test voltage value for the odd touch electrodes (for example, the high test voltage value is 5V), and the remaining of the test signal lines provides a low test voltage value for the even touch electrodes (for example, the low test voltage value is 1V), thus distinguishing between light and dark regions by adjusting a voltage difference between different test signal lines. Since the touch electrode is a common electrode in the display region, the applying of a voltage to the touch electrode can change the deflection state of liquid crystals in the corresponding display region and thereby change the light transmittance of the region. The higher the applied voltage value is, the higher the brightness of the corresponding display region is, and the lower the applied voltage value is, the lower the brightness of the corresponding display region is. The display region is divided into dark display regions and bright display regions with sharp contrast for detection. According to the pattern, a defect such as short circuit/open circuit can be determined.

SUMMARY

The present disclosure mainly provides the following technical solutions.

In a first aspect, the present disclosure provides a touch display panel including a base substrate, a plurality of first touch electrodes, a plurality of second touch electrodes, a plurality of first leads, a plurality of second leads, a plurality of first data lines and a plurality of second data lines located above the base substrate, wherein each of the first leads is connected to one of the first touch electrodes, each of the second leads is connected to one of the second touch electrodes, the base substrate includes a display region and a non-display region, wherein the touch display panel further includes: a plurality of first touch test switches, a plurality of second touch test switches, a first test signal line, a second test signal line, one or two test control gate lines, a plurality of first data test switches, and a plurality of second data test switches located in the non-display region;

wherein the first leads and the first data lines share the first test signal line, the second leads and the second data lines share the second test signal line; and the first touch test switches for controlling the first leads and the first data test switches for controlling the first data lines are not simultaneously turned on, the second touch test switches for controlling the second leads and the second data test switches for controlling the second data lines are not simultaneously turned on.

According to some embodiments of the present disclosure, in the case where the touch display panel includes two test control gate lines, the two test control gate lines include a first test control gate line and a second test control gate line;

a first terminal of the first touch test switch is electrically connected to the first lead, a second terminal of the first touch test switch is electrically connected to the first test signal line, and a control terminal of the first touch test switch is electrically connected to the first test control gate line;

a first terminal of the second touch test switch is electrically connected to the second lead, a second terminal of the second touch test switch is electrically connected to the second test signal line, and a control terminal of the second touch test switch is electrically connected to the first test control gate line;

a first terminal of the first data test switch is electrically connected to the first data line, a second terminal of the first data test switch is electrically connected to the first test signal line, and a control terminal of the first data test switch is electrically connected to the second test control gate line;

a first terminal of the second data test switch is electrically connected to the second data line, a second terminal of the second data test switch is electrically connected to the second test signal line, and a control terminal of the second data test switch is electrically connected to the second test control gate line.

According to some embodiments of the present disclosure, the first touch electrodes and the second touch electrodes are alternately arranged along a first direction, and the first touch electrodes and the second touch electrodes are further alternately arranged along a second direction perpendicular to the first direction.

According to some embodiments of the present disclosure, the display region includes a plurality of common electrodes arranged in blocks, and a plurality of sub-pixel units arranged in an array, wherein each of the sub-pixel units includes a thin film transistor;

the first touch electrodes share a portion of the common electrodes, and the second touch electrodes share the remaining of the common electrodes.

According to some embodiments of the present disclosure, gates of the first touch test switches, the second touch test switches, the first data test switches and the second data test switches are located on the same layer as a gate of the thin film transistor;

sources of the first touch test switches, the second touch test switches, the first data test switches and the second data test switches are located on the same layer as a source of the thin film transistor;

drains of the first touch test switches, the second touch test switches, the first data test switches, and the second data test switches are located on the same layer as a drain of the thin film transistor.

According to some embodiments of the present disclosure, the touch display panel includes one test control gate line;

a first terminal of the first touch test switch is electrically connected to the first lead, a second terminal of the first touch test switch is electrically connected to the first test signal line, and a control terminal of the first touch test switch is electrically connected to the test control gate line;

a first terminal of the second touch test switch is electrically connected to the second lead, a second terminal of the second touch test switch is electrically connected to the second test signal line, and a control terminal of the second touch test switch is electrically connected to the test control gate line;

a first terminal of the first data test switch is electrically connected to the first data line, a second terminal of the first data test switch is electrically connected to the first test signal line, and a control terminal of the first data test switch is electrically connected to the test control gate line;

a first terminal of the second data test switch is electrically connected to the second data line, a second terminal of the second data test switch is electrically connected to the second test signal line, and a control terminal of the second data test switch is electrically connected to the test control gate line;

when the first touch test switch and the second touch test switch are turned on under the control of the test control gate line, the first data test switch and the second data test switch are turned off under the control of the control gate line; or when the first touch test switch and the second touch test switch are turned off under the control of the test control gate line, the first data test switch and the second data test switch are turned on under the control of the control gate line.

According to some embodiments of the present disclosure, the first touch test switch and the second touch test switch are N-type thin film transistors, and the first data test switch and the second data test switch are P-type thin film transistors; or the first touch test switch and the second touch test switch are P-type thin film transistors, and the first data test switch and the second data test switch are N-type thin film transistors.

According to some embodiments of the present disclosure, the touch display panel further includes: a plurality of first auxiliary touch test switches, a plurality of second auxiliary touch test switches, an auxiliary test control gate line, a plurality of first auxiliary data test switches, and a plurality of second auxiliary data test switches, wherein the control terminals of the first auxiliary touch test switch, the second auxiliary touch test switch, the first auxiliary data test switch, and the second auxiliary data test switch are electrically connected to the auxiliary test control gate line;

the first auxiliary touch test switch is connected in series with the first touch test switch, a first terminal of the series-connected first auxiliary touch test switch and the first touch test switch is electrically connected to the first lead, and a second terminal of the series-connected first auxiliary touch test switch and the first touch test switch is electrically connected to the first test signal line;

the second auxiliary touch test switch is connected in series with the second touch test switch, a first terminal of the series-connected second auxiliary touch test switch and the second touch test switch is electrically connected to the second lead, and a second terminal of the series-connected second auxiliary touch test switch and the second touch test switch is electrically connected to the second test signal line;

the first auxiliary data test switch is connected in series with the first data test switch, a first terminal of the series-connected first auxiliary data test switch and the first data test switch is electrically connected to the first data line, and a second terminal of the series-connected first auxiliary data test switch and the first data test switch is electrically connected to the first test signal line;

the second auxiliary data test switch is connected in series with the second data test switch, a first terminal of the series-connected second auxiliary data test switch and the second data test switch is electrically connected to the second data line, and a second terminal of the series-connected second auxiliary data test switch and the second data test switch is electrically connected to the second test signal line.

According to some embodiments of the present disclosure, the first touch electrodes and the second touch electrodes are alternately arranged along a first direction, and the first touch electrodes and the second touch electrodes are further alternately arranged along a second direction perpendicular to the first direction.

According to some embodiments of the present disclosure, the display region includes a plurality of common electrodes arranged in blocks, and a plurality of sub-pixel units arranged in an array, wherein each of the sub-pixel unit includes a thin film transistor;

the first touch electrodes share a portion of the common electrodes, and the second touch electrodes share the remaining of the common electrodes.

According to some embodiments of the present disclosure, gates of the first touch test switches, the second touch test switches, the first data test switches and the second data test switches are located on the same layer as a gate of the thin film transistor;

sources of the first touch test switches, the second touch test switches, the first data test switches and the second data test switches are located on the same layer as a source of the thin film transistor;

drains of the first touch test switches, the second touch test switches, the first data test switches, and the second data test switches are located on the same layer as a drain of the thin film transistor.

In a second aspect, the present disclosure provides a display device, including the touch display panel according to the first aspect.

The above description is only a summary of the technical solution in this disclosure. In order to understand the technical means of the present disclosure more clearly, it can be implemented in accordance with the content of this specification, and in order to make the above and other objects, features, and advantages of the present disclosure more comprehensible, specific embodiments of the present disclosure are given below.

BRIEF DESCRIPTION OF THE DRAWINGS

Various other advantages and benefits will become apparent to those of ordinary skill in the art by reading the detailed description of embodiments below. The drawings are only for the purpose of illustrating the embodiments and are not considered as limitations to the present disclosure. Furthermore, the same reference numerals are used to denote the same parts throughout the drawings. In the drawings.

DETAILED DESCRIPTION

Figure 1:
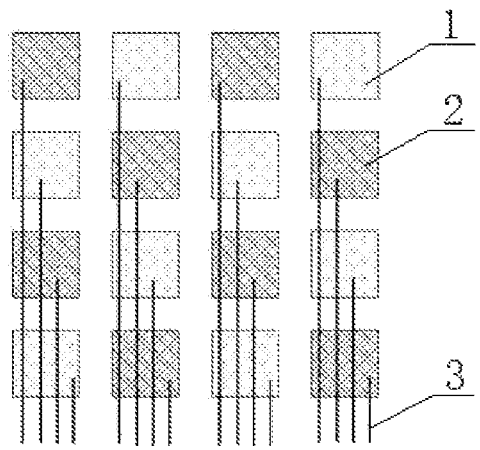
FIG. 1 is a schematic structural diagram of odd touch electrodes and even touch electrodes in a touch display panel in the related art.

Exemplary embodiments of the present disclosure will now be described in detail with reference to the accompanying drawings. Although the exemplary embodiments of the present disclosure are shown in the drawings, it should be understood that the present disclosure can be implemented in various forms and should not be limited by the embodiments set forth herein. Rather, these embodiments are provided to enable a more thorough understanding of the present disclosure and to fully convey the scope of the present disclosure to those skilled in the art.

The applicant found that when a touch test and a data test are performed simultaneously, two different test signal lines and two different test control lines are required to perform the test respectively, which occupy a large wiring space in the non-display region, and is not conducive to the design of a narrow frame.

In view of this, the present disclosure provides a touch display panel and a display device to address the problem in the prior art that the narrow frame cannot be realized due to the large wiring space of the non-display region.

With the technical solutions of the present disclosure, the technical solutions provided in the present disclosure have at least the following advantages:

the wiring space can be saved and the technical purpose of the narrow frame can be achieved since the present disclosure provides a plurality of first touch test switches, second touch test switches, first data test switches and second data test switches in the non-display region, and the first touch test switches and the second touch test switches share the same first test control gate line, the first data test switches and the second data test switches share the same second test control gate line, the first touch test switches and the first data test switches share the same first test signal line, the second touch test switches and the second data test switches share the same second test signal line. In addition, the above structure can also reduce the input signals and reduce the power consumption.

Figure 2:
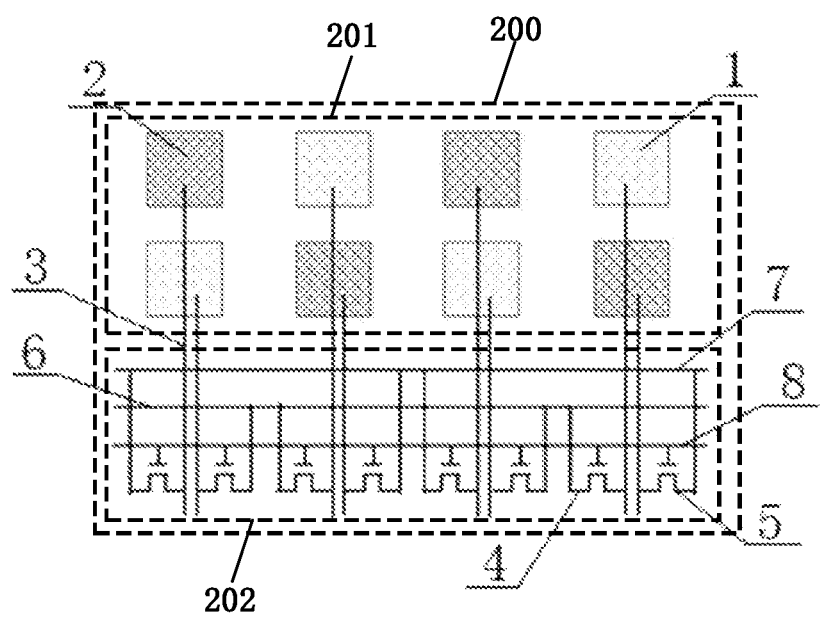
FIG. 2 is a schematic structural diagram of a test circuit in a touch display panel in the related art.

FIGS. 1 and 2 show schematic structural diagrams of a touch test circuit in a touch display panel in the related art. As shown in FIGS. 1 and 2, the touch display panel includes first touch electrodes 1 (also referred to odd touch electrodes) and second touch electrodes 2 (also referred to even touch electrodes) that are alternately arranged with each other. The first touch electrodes 1 and the second touch electrodes 2 share common electrodes of the touch display panel, and each of the first touch electrodes 1 and the second touch electrodes 2 is connected to a touch electrode lead 3.

As shown in FIGS. 1 and 2, in a touch test, the first touch electrodes 1 are provided with a high test voltage value, while the second touch electrodes 2 are provided with a low test voltage value. A voltage difference between the touch electrode leads 3 is adjusted to clearly distinguish between light and dark regions. For example, the second touch electrodes 2 are provided with the low test voltage value of 1V, and the first touch electrodes 1 are provided with the high test voltage value of 5V. Since the first touch electrodes 1 and the second touch electrodes 2 are the common electrodes of the display region, the applying of a voltage to the touch electrode can change the liquid crystal state of the corresponding display region, and thus can change the light transmittance of this region. For example, according to different design requirements, the higher the applied voltage value is, the higher the brightness of the corresponding display region is, and the lower the applied voltage value is, the lower the brightness of the corresponding display region is; or the higher the applied voltage value is, the lower the brightness of the corresponding display region is, the lower the applied voltage value is, the higher the brightness of the corresponding display region is. The display region is divided into dark regions and bright regions with sharp contrast for detection. According to the pattern, a defect such as short circuit or open circuit can be determined.

However, the applicant found that when a touch test and a data line test are performed on the display panel simultaneously, two different test signal lines and two different test control lines are required respectively, which occupy a large wiring space in the non-display region, and is not conducive to the design of a narrow frame.

In order to address the above technical problem, embodiments of the present disclosure provide a touch display panel. For convenience of description, some reference numerals in the following embodiments are the same as those in FIGS. 1 and 2.

Figure 3:
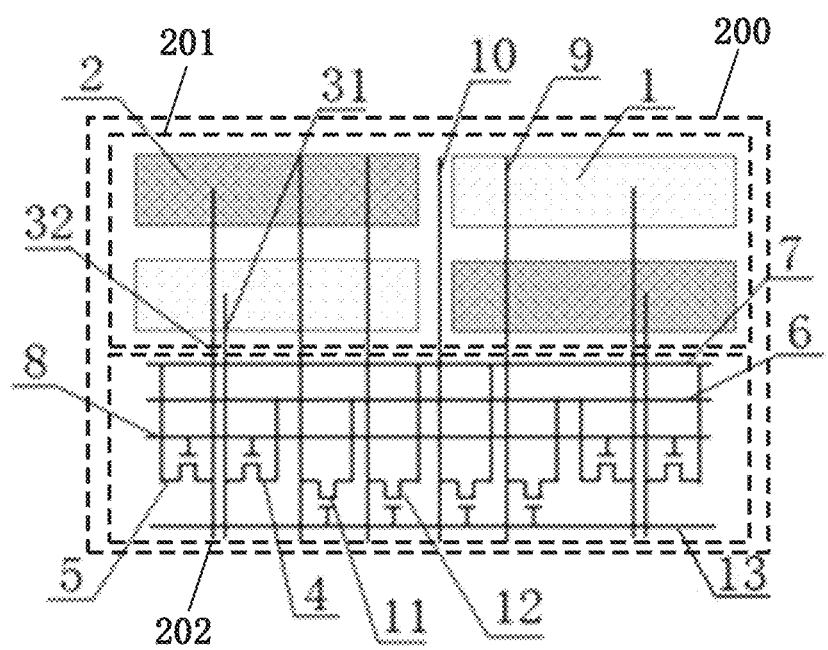
FIG. 3 is a test circuit diagram of a touch display panel according to an embodiment of the present disclosure.

As shown in FIG. 3, the touch display panel in this embodiment includes a base substrate 200, a plurality of first touch electrodes 1, a plurality of second touch electrodes 2, a plurality of first leads 31, a plurality of second leads 32, a plurality of first data lines 9 and a plurality of second data lines 10 located above the base substrate 200, wherein each of the first leads 31 is connected to one of the first touch electrodes 1, each of the second leads 32 is connected to one of the second touch electrodes 2, the base substrate 200 includes a display region 201 and a non-display region 202. The arrangement of the display region 201 and the non-display region 202 is the same as that in the prior art and will not be repeated herein.

As shown in FIG. 3, the touch display panel further includes: a plurality of first touch test switches 4, a plurality of second touch test switches 5, a first test signal line 6, a second test signal line 7, a first test control gate line 8, a second test control gate line 13, a plurality of first data test switches 11, and a plurality of second data test switches 12 located in the non-display region 202. For example, the first leads 31 and the first data lines 9 share the first test signal line 6, the second leads 32 and the second data lines 10 share the second test signal line 7; and the first touch test switch 4 for controlling the first leads 31 and the first data test switch 11 for controlling the first data lines 9 are not simultaneously turned on, the second touch test switch 5 for controlling the second leads 32 and the second data test switch 12 for controlling the second data lines 10 are not simultaneously turned on.

For example, a first terminal of the first touch test switch 4 is electrically connected to the first lead 31, a second terminal thereof is electrically connected to the first test signal line 6, and a control terminal thereof is electrically connected to the first test control gate line 8. A first terminal of the second touch test switch 5 is electrically connected to the second lead 32, a second terminal thereof is electrically connected to the second test signal line 7, and a control terminal thereof is electrically connected to the first test control gate line 8. A first terminal of the first data test switch 11 is electrically connected to the first data line 9, a second terminal thereof is electrically connected to the first test signal line 6, and a control terminal thereof is electrically connected to the second test control gate line 13. A first terminal of the second data test switch 12 is electrically connected to the second data line 10, a second terminal thereof is electrically connected to the second test signal line 7, and a control terminal thereof is electrically connected to the second test control gate line 13.

The wiring space can be saved and the technical purpose of the narrow frame can be achieved since this embodiment provides a plurality of first touch test switches, second touch test switches, first data test switches and second data test switches in the non-display region, wherein the first touch test switches and the second touch test switches share the same first test control gate line, the first data test switches and the second data test switches share the same second test control gate line, the first touch test switches and the first data test switches share the same first test signal line, the second touch test switches and the second data test switches share the same second test signal line. In addition, the above structure can also reduce the input signals and reduce the power consumption.

In this embodiment, the first touch test switch 4 and the second touch test switch 5 are N-type thin film transistors; the first data test switch 11 and the second data test switch 12 are P-type thin film transistors. When the voltage signal input from the first test control gate line 8 is 0V, both the first touch test switch 4 and the second touch test switch 5 are turned off. When the voltage signal input from the second test control gate line 13 is 0V, both the first data test switch 11 and the second data test switch 12 are turned off. In an embodiment, when the voltage signal input from the first test control gate line 8 is 5V, the first touch test switch 4 and the second touch test switch 5 are turned on; when the voltage signal input from the first test control gate line 8 is −5V, the first touch test switch 4 and the second touch test switch 5 are turned off. In another embodiment, when the voltage signal input from the second test control gate line 13 is −5V, the first data test switch 11 and the second data test switch 12 are turned on; when the voltage signal input from the second test control gate line 13 is 5V, the first data test switch 11 and the second data test switch 12 are turned off.

The first touch test switch 4 and the second touch test switch 5 for touch detection, and the first data test switch 11 and the second data test switch 12 for data line detection can be arbitrarily selected from P-type thin film transistors and N-type thin film transistors, which can reduce the manufacturing cost and difficulty.

According to some embodiments of the present disclosure, the first touch electrodes 1 and the second touch electrodes 2 are alternately arranged along a first direction. The first touch electrodes 1 and the second touch electrodes 2 are further alternately arranged along a second direction perpendicular to the first direction. Specifically, the first direction may be a horizontal direction and the second direction may be a vertical direction; or the first direction may be a vertical direction and the second direction may be a horizontal direction.

Since the first touch electrodes 1 and the second touch electrodes 2 are alternately arranged along different directions, when different voltages are applied to the first touch electrodes 1 and the second touch electrodes 2, the touch detection can be performed on the display panel.

According to some embodiments of the present disclosure, the display region includes a plurality of common electrodes arranged in blocks, and a plurality of sub-pixel units (not shown in the figure) arranged in an array, wherein each of the sub-pixel units includes a thin film transistor (not shown in the figure). The first touch electrodes share a portion of the common electrodes, and the second touch electrodes share the remaining of the common electrodes.

According to some embodiments of the present disclosure, gates of the first touch test switches 4, the second touch test switches 5, the first data test switches 11 and the second data test switches 12 are located on the same layer as a gate of the thin film transistor included in the sub-pixel unit. Sources of the first touch test switches 4, the second touch test switches 5, the first data test switches 11 and the second data test switches 12 are located on the same layer as a source of the thin film transistor included in the sub-pixel unit. Moreover, drains of the first touch test switches 4, the second touch test switches 5, the first data test switches 11 and the second data test switches 12 are located on the same layer as a drain of the thin film transistor included in the sub-pixel unit. In this way, the manufacturing cost can be saved.

Figure 4:
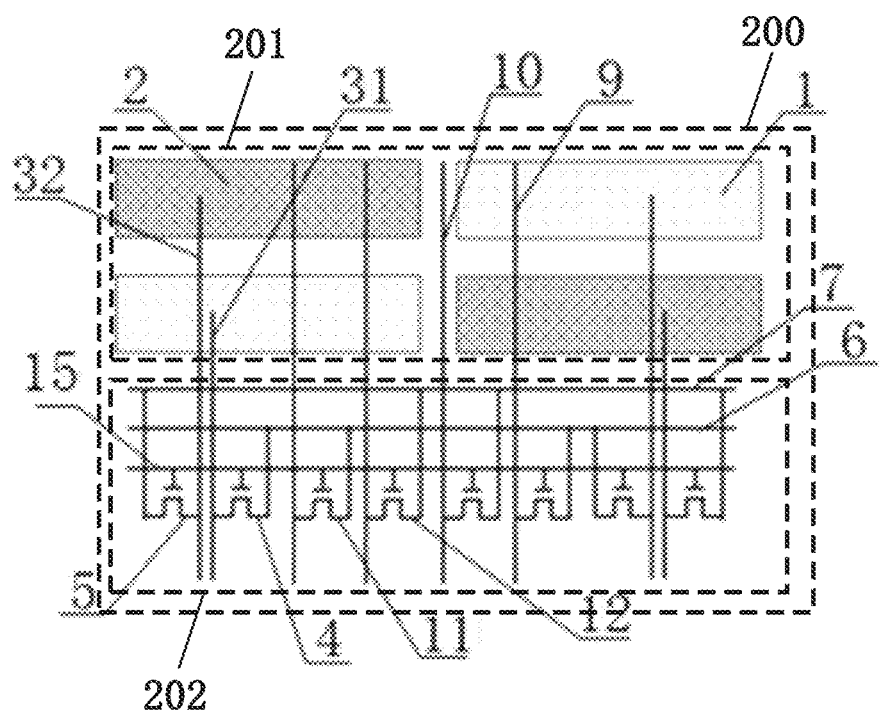
FIG. 4 is a test circuit diagram of a touch display panel according to an embodiment of the present disclosure.

Based on the same concept, FIG. 4 further discloses another touch display panel of the present disclosure, which includes a base substrate 200, a plurality of first touch electrodes 1, a plurality of second touch electrodes 2, a plurality of first leads 31, a plurality of second leads 32, a plurality of first data lines 9 and a plurality of second data lines 10 located above the base substrate 200, wherein each of the first leads 31 is connected to one of the first touch electrodes 1, each of the second leads 32 is connected to one of the second touch electrodes 2, the base substrate 200 includes a display region 201 and a non-display region 202. The arrangement of the display region 201 and the non-display region 202 is the same as that in the prior art and will not be repeated herein.

As shown in FIG. 4, the touch display panel further includes: a plurality of first touch test switches 4, a plurality of second touch test switches 5, a first test signal line 6, a second test signal line 7, a test control gate line 15, a plurality of first data test switches 11, and a plurality of second data test switches 12 located in the non-display region 202. For example, the first leads 31 and the first data lines 9 share the first test signal line 6, the second leads 32 and the second data lines 10 share the second test signal line 7; and the first touch test switch 4 for controlling the first leads 31 and the first data test switch 11 for controlling the first data lines 9 are not simultaneously turned on, the second touch test switch 5 for controlling the second leads 32 and the second data test switch 12 for controlling the second data lines 10 are not simultaneously turned on.

For example, a first terminal of the first touch test switch 4 is electrically connected to the first lead 31, a second terminal thereof is electrically connected to the first test signal line 6, and a control terminal thereof is electrically connected to the test control gate line 15. A first terminal of the second touch test switch 5 is electrically connected to the second lead 32, a second terminal thereof is electrically connected to the second test signal line 7, and a control terminal thereof is electrically connected to the test control gate line 15. A first terminal of the first data test switch 11 is electrically connected to the first data line 9, a second terminal thereof is electrically connected to the first test signal line 6, and a control terminal thereof is electrically connected to the test control gate line 15. A first terminal of the second data test switch 12 is electrically connected to the second data line 10, a second terminal thereof is electrically connected to the second test signal line 7, and a control terminal thereof is electrically connected to the test control gate line 15.

Moreover, when the first touch test switch 4 and the second touch test switch 5 are turned on under the control of the test control gate line 15, the first data test switch 11 and the second data test switch 12 are turned off under the control of the control gate line 15; or when the first touch test switch 4 and the second touch test switch 5 are turned off under the control of the test control gate line 15, the first data test switch 11 and the second data test switch 12 are turned on under the control of the control gate line 15.

According to some embodiments of the present disclosure, the first touch test switch 4 and the second touch test switch 5 are N-type thin film transistors, and the first data test switch 11 and the second data test switch 12 are P-type thin film transistors. In another embodiment, the first touch test switch 4 and the second touch test switch 5 are P-type thin film transistors, and the first data test switch 11 and the second data test switch 12 are N-type thin film transistors.

As shown in FIG. 4, the first touch test switch 4 and the second touch test switch 5 are N-type thin film transistors; the first data test switch 11 and the second data test switch 12 are P-type thin film transistors. When the voltage signal input from the test control gate line 15 is 0V, both the first touch test switch 4 and the second touch test switch 5 are turned off, and both the first data test switch 11 and the second data test switch 12 are turned off. When the voltage signal input from the test control gate line 15 is 5V, the first touch test switch 4 and the second touch test switch 5 are turned on; when the voltage signal input from the test control gate line 15 is −5V, the first touch test switch 4 and the second touch test switch 5 are turned off. When the voltage signal input from the test control gate line 15 is −5V, the first data test switch 11 and the second data test switch 12 are turned on; when the voltage signal input from the test control gate line 15 is 5V, the first data test switch 11 and the second data test switch 12 are turned off.

Figure 5:
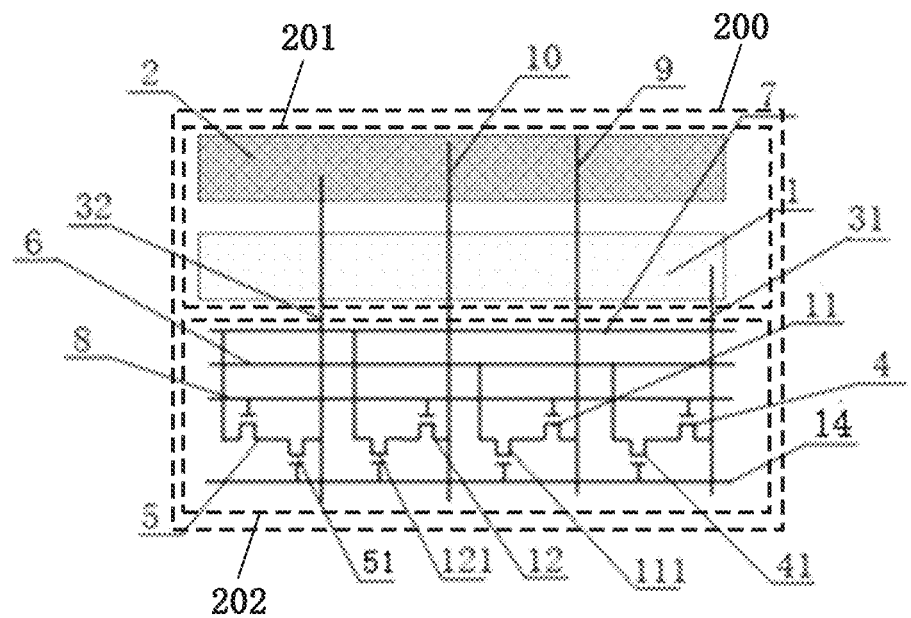
FIG. 5 is a test circuit diagram of a touch display panel according to an embodiment of the present disclosure.

According to some embodiments of the present disclosure, as shown in FIG. 5, the touch display panel of this embodiment further includes: a plurality of first auxiliary touch test switches 41, a plurality of second auxiliary touch test switches 51, an auxiliary test control gate line 14, a plurality of first auxiliary data test switches 111, and a plurality of second auxiliary data test switches 121. The control terminals of the first auxiliary touch test switches 41, the second auxiliary touch test switches 51, the first auxiliary data test switches 111, and the second auxiliary data test switches 121 are electrically connected to the auxiliary test control gate line 14. The first auxiliary touch test switch 41 is connected in series with the first touch test switch 4. A first terminal of the series-connected first auxiliary touch test switch 41 and first touch test switch 4 is electrically connected to the first lead 31, and a second terminal of the series-connected first auxiliary touch test switch 41 and first touch test switch 4 is electrically connected to the first test signal line 6. The second auxiliary touch test switch 51 is connected in series with the second touch test switch 5. A first terminal of the series-connected second auxiliary touch test switch 51 and second touch test switch 5 is electrically connected to the second lead 32, and a second terminal of the series-connected second auxiliary touch test switch 51 and second touch test switch 5 is electrically connected to the second test signal line 7. The first auxiliary data test switch 111 is connected in series with the first data test switch 11. A first terminal of the series-connected first auxiliary data test switch 111 and first data test switch 11 is electrically connected to the first data line 9, and a second terminal of the series-connected first auxiliary data test switch 111 and first data test switch 11 is electrically connected to the first test signal line 6. The second auxiliary data test switch 121 is connected in series with the second data test switch 12. A first terminal of the series-connected second auxiliary data test switch 121 and second data test switch 12 is electrically connected to the second data line 10, and a second terminal of the series-connected second auxiliary data test switch 121 and second data test switch 12 is electrically connected to the second test signal line 7.

In FIG. 5, the first touch test switch 4 is connected in series with a first auxiliary touch test switch 41, the second touch test switch 5 is connected in series with a second auxiliary touch test switch 51; the first data test switch 11 is connected in series with the first auxiliary data test switch 111, the second data test switch 12 is connected in series with the second auxiliary data test switch 121. The first auxiliary touch test switch 41, the second auxiliary touch test switch 51, the first auxiliary data test switch 111 and the second auxiliary data test switch 121 may be N-type thin film transistors or P-type thin film transistors. The auxiliary test control gate line 14 is used to completely turn off the first auxiliary touch test switch 41, the second auxiliary touch test switch 51, the first auxiliary data test switch 111, and the second auxiliary data test switch 121 when the testing is not performed, so as to prevent an increase in a leakage current. That is, the N-type thin film transistor is completely turned off when a signal of the auxiliary test control gate line is −5V, and the P-type thin film transistor is completely turned off when a signal of the auxiliary test control gate line is 5V. As compared with that both the N-type thin film transistor and the P-type thin film transistor are simultaneously turned off when a turn-off voltage of the test control gate line is 0V, a lower leakage current can be achieved.

Since the auxiliary test control gate line 14 for completely turning off the first auxiliary touch test switch 41, the second auxiliary touch test switch 51, the first auxiliary data test switch 111 and the second auxiliary data test switch 121 when the testing is not performed is further provided in the display panel, the increase in the leakage current can be prevented.

In an embodiment, the first auxiliary touch test switch 41, the second auxiliary touch test switch 51, the first auxiliary data test switch 111, and the second auxiliary data test switch 121 are N-type thin film transistors. Alternatively, in another embodiment, the first auxiliary touch test switch 41, the second auxiliary touch test switch 51, the first auxiliary data test switch 111, and the second auxiliary data test switch 121 are P-type thin film transistors.

According to some embodiments of the present disclosure, the first touch electrodes 1 and the second touch electrodes 2 are alternately arranged along a first direction. The first touch electrodes 1 and the second touch electrodes 2 are further alternately arranged along a second direction perpendicular to the first direction. Specifically, the first direction may be a horizontal direction and the second direction may be a vertical direction; or the first direction may be a vertical direction and the second direction may be a horizontal direction.

Since the first touch electrodes 1 and the second touch electrodes 2 are alternately arranged along different directions, different voltages can be applied to the first touch electrodes 1 and the second touch electrodes 2, so that touch detection can be performed on the display panel.

According to some embodiments of the present disclosure, the display region includes a plurality of common electrodes arranged in blocks, and a plurality of sub-pixel units (not shown in the figure) arranged in an array, wherein each of the sub-pixel units includes a thin film transistor (not shown in the figure). The first touch electrodes 1 share a portion of the common electrodes, and the second touch electrodes 2 share the remaining of the common electrodes.

According to some embodiments of the present disclosure, gates of the first touch test switches 4, the second touch test switches 5, the first data test switches 11 and the second data test switches 12 are located on the same layer as a gate of the thin film transistor included in the sub-pixel unit. Sources of the first touch test switches 4, the second touch test switches 5, the first data test switches 11 and the second data test switches 12 are located on the same layer as a source of the thin film transistor included in the sub-pixel unit. In another embodiment, drains of the first touch test switches 4, the second touch test switches 5, the first data test switches 11 and the second data test switches 12 are located on the same layer as a drain of the thin film transistor included in the sub-pixel unit. In this way, the manufacturing cost can be saved.

Based on the same concept, in a second aspect, an embodiment of the present disclosure provides a display device, including the touch display panel according to the first aspect. Since the display device in the second aspect includes the touch display panel in the first aspect, the display device has similar beneficial effects as the touch display panel, which will not be repeated herein.

The touch display panel of the embodiment of the present disclosure will be described more clearly below with reference to FIGS. 6 to 12.

Figure 6:
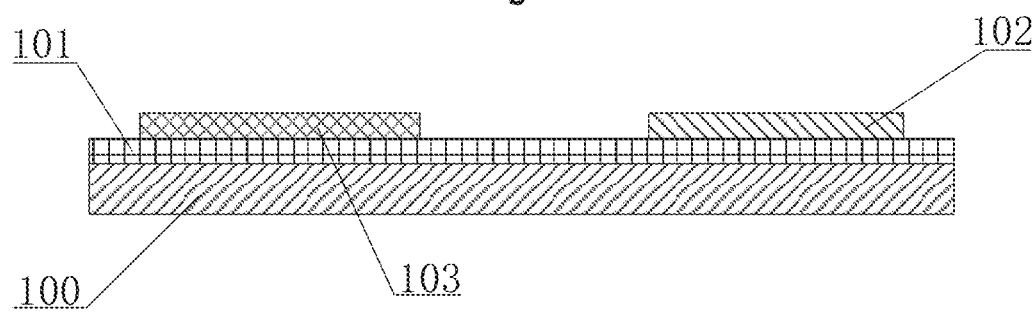
FIG. 6 is a schematic structural diagram of forming a buffer layer, a polysilicon storage capacitor layer and an active layer on an insulating substrate.

For example, as shown in FIG. 6, a silicon nitride (SiN) film and a silicon dioxide (SiO2) film are firstly deposited in sequence on an entire insulating substrate 100 by a Plasma Enhanced Chemical Vapor Deposition (PECVD) to form a buffer layer 101 made of silicon nitride and silicon dioxide. The insulating substrate 100 may be a glass, or a flexible substrate such as PI. Next, an amorphous silicon (a-Si) thin film is formed on the buffer layer 101 by the PECVD or other chemical or physical vapor deposition methods. The a-Si thin film is made into a polysilicon thin film by the Laser Annealing (ELA) or the Solid Phase Crystallization (SPC). Then a traditional mask process is used to form a pattern of a photoresist layer on the polysilicon thin film. With the photoresist layer as an etching barrier layer, the polysilicon thin film that is not protected by the photoresist layer is etched by plasma to form a polysilicon active layer 103 and a polysilicon storage capacitor layer 102. A low-concentration ion doping is performed on the transistor channel in the active layer 103 using an ion implantation process, so as to form, in the active layer 103, a conductive channel required by the thin film transistor.

Figure 7:
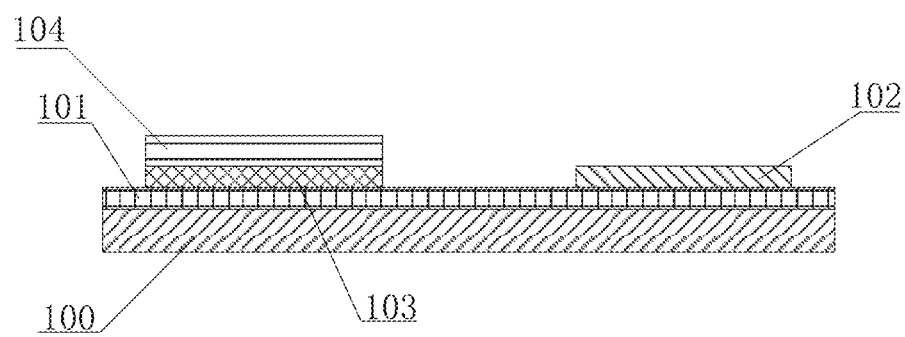
FIG. 7 is a schematic structural diagram of forming a photoresist on the substrate of FIG. 6.

As shown in FIG. 7, a photoresist 104 composed of a photoresist material is formed on the active layer 103 through a mask process to protect the active layer 103 from the ion implantation. A high-concentration ion implantation process is performed on the polysilicon storage capacitor layer 102 without the protection of the photoresist 104 to convert the polysilicon storage capacitor layer 102 into a low-resistance doped polysilicon film. During the subsequent processes shown in FIGS. 8 to 13, since a second plate of the capacitor formed by a gate insulating layer and a gate metal film is formed only on the polysilicon storage capacitor layer 102, in FIG. 8 to FIG. 13, the subsequent photolithography process of the polysilicon storage capacitor layer 102, that is, the photolithography process of forming the second plate of the capacitor is not shown.

Figure 8:
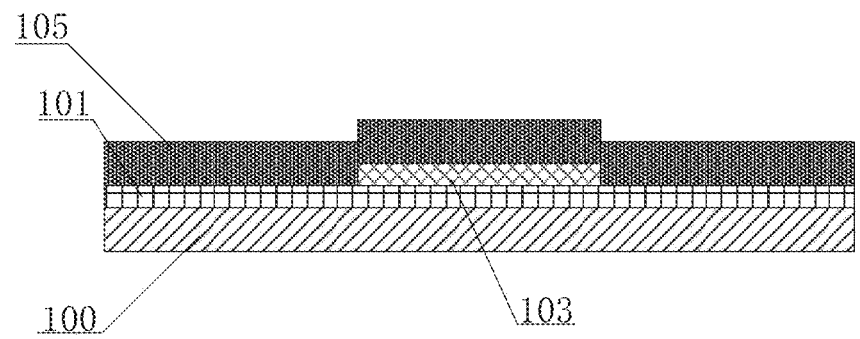
FIG. 8 is a schematic structural diagram of forming a gate insulating layer and a gate on the substrate of FIG. 7.

As shown in FIG. 8, the photoresist 104 on the active layer 103 is removed by a photoresist stripping process, and a SiO2 film or a composite film of SiO2 and SiN is deposited by the PECVD to form a gate insulating layer 105 on the polysilicon storage capacitor layer 102, the active layer 103, and the entire buffer layer 101.

Figure 9:
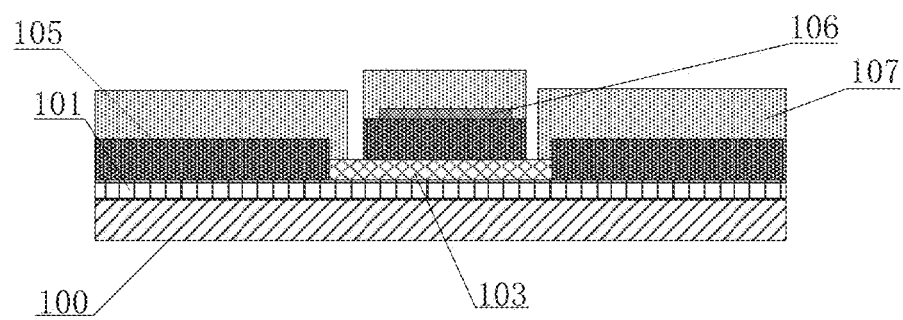
FIG. 9 is a schematic structural diagram of forming an interlayer insulating layer on the substrate of FIG. 8.

As shown in FIG. 9, one or more low-resistance metal material films are deposited on the gate insulating layer 105 by a physical vapor deposition method such as the magnetron sputtering, and a gate 106 is formed by a photolithography process. The gate metal film may be a single-layer metal film such as Al, Cu, Mo, Ti, or AlNd, or a multilayer metal film such as Mo/Al/Mo or Ti/Al/Ti. With the gate 106 as an ion implantation blocking layer, the active layer 103 is ion-doped to form a low-impedance source and drain electrode contact regions in the region of the active layer 103 that is not blocked by the gate.

As shown in FIG. 9, on the entire surface including the gate 106, a SiO2 film and a SiN film are sequentially deposited by the PECVD to form an interlayer insulating layer 107, and the interlayer insulating layer 107 is etched through a masking and etching process to form source and drain contact holes.

Figure 10:
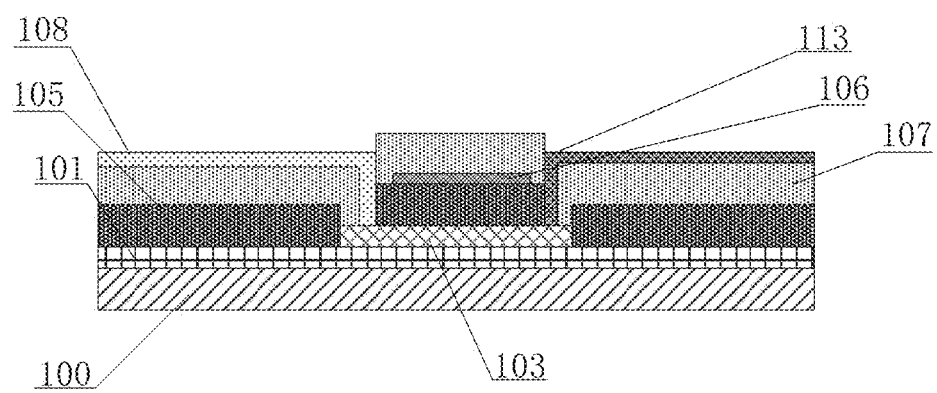
FIG. 10 is a schematic structural diagram of forming a source and a drain on the substrate of FIG. 9.

As shown in FIG. 10, one or more low-resistance metal films are deposited on the interlayer insulating layer 107 and the source and drain contact holes by the magnetron sputtering, and a source 108 and a drain 113 are formed through a masking and etching process. The source 108 and the drain 113 form an ohmic contact with the active layer 103 through the contact holes. Rapid thermal annealing or heat treatment furnace annealing is used to activate the ions doped in the active layer 103 to form an effective conductive channel in the active layer 103 under the gate 106. The source-drain metal film may be a single-layer metal film such as Al, Cu, Mo, Ti, or AlNd, or a multilayer metal film such as Mo/Al/Mo or Ti/Al/Ti.

Figure 11:
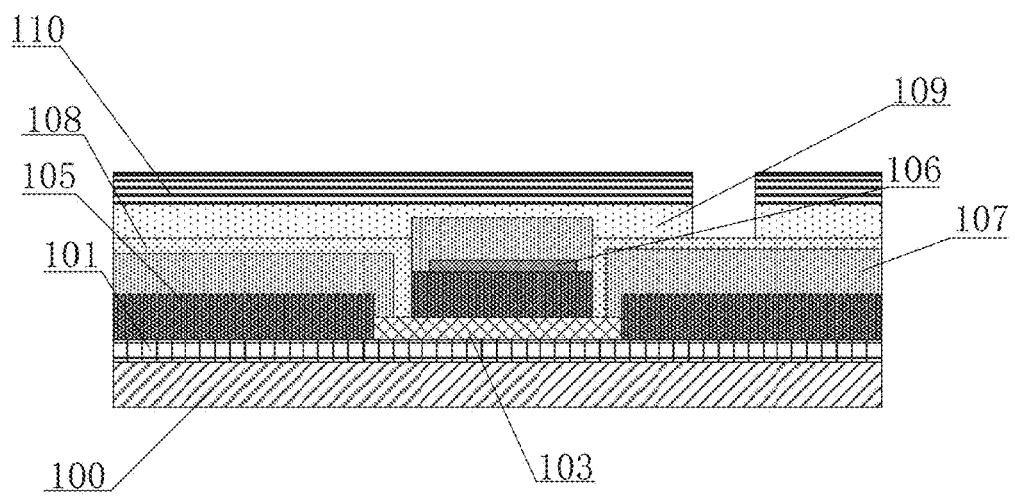
FIG. 11 is a schematic structural diagram of forming a passivation layer and a planarization layer on the substrate of FIG. 10.

As shown in FIG. 11, a layer of SiN film is deposited on the entire surface including the source 108 and the drain 113 by the PECVD, and a passivation layer 109 including a via hole is formed through a masking and etching process. A hydrogenation process is performed using the rapid thermal annealing or the heat treatment furnace annealing to repair defects inside and at the interface of the active layer 103. Again, through the masking process, an organic planarization layer 110 having the same via hole as the via hole is formed on the SiN passivation layer 109 to fill the depressions on the surface of the device and form a flat surface.

Figure 12:
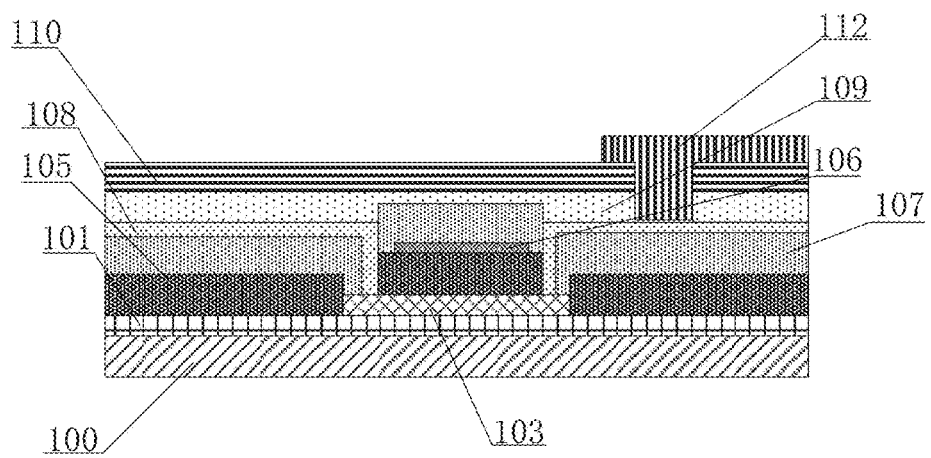
FIG. 12 is a schematic structural diagram of forming a pixel electrode on the substrate of FIG. 11.

As shown in FIG. 12, a transparent conductive film is deposited on the organic planarization layer 110 and the via hole by the magnetron sputtering, and the transparent conductive film is etched by a photolithography process to form a pixel electrode 112 in the pixel region on the via hole and a portion of the planarization layer 110. The transparent conductive film may be a single-layer oxide conductive film, such as ITO (indium tin oxide) or IZO (indium zinc oxide), or a composite film such as ITO (indium tin oxide)/Ag/ITO, IZO (indium zinc oxide)/Ag, etc.

Figure 13:
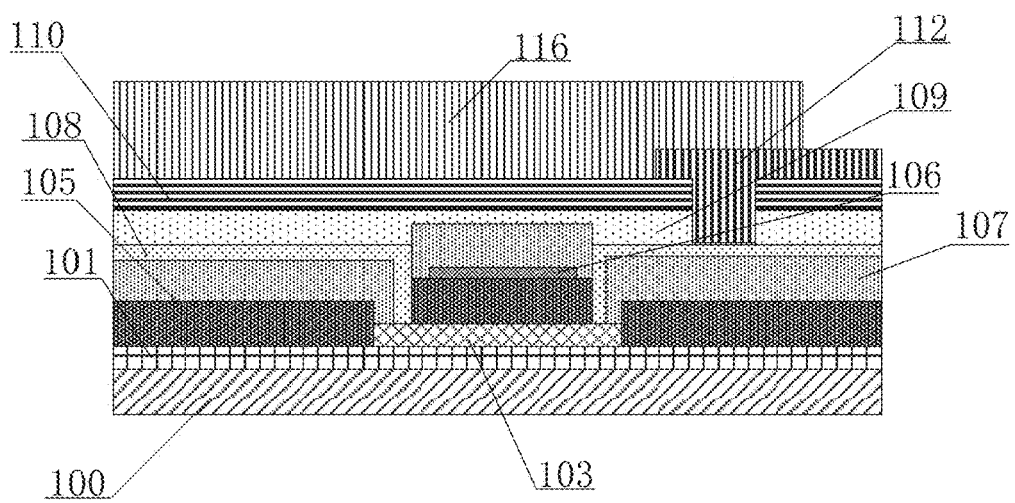
FIG. 13 is a schematic structural diagram of forming a pixel definition layer on the substrate of FIG. 12.

Then, a layer of photosensitive organic material similar to the planarization layer 110 is coated on the planarization layer 110 and the pixel electrode 112, and a portion of the pixel electrode 112 is exposed through a last masking process to form the pixel definition layer 116 shown in FIG. 13. The pixel definition layer 116 covers the planarization layer 110 and a portion of the pixel electrode 112.

Table 1 shows the materials and corresponding thicknesses of the main coatings in the touch display panel in this embodiment. However, those skilled in the art can select other suitable materials and thicknesses according to actual needs.

TABLE 1

| coating | material | thickness (angstrom) |
|---|---|---|
| insulating substrate | PI | 90000 |
| buffer layer | SiNx/SiOx | 5000 |
| gate insulating layer | SiOx | 1200 |
| gate | Mo | 2500 |
| interlayer insulating layer | SiNx/SiOx | 4500 |
| source/drain | Ti/Al/Ti | 8000 |
| passivation layer | SiNx | 2500 |
| planarization layer | PI | 12000 |
| pixel electrode | ITO/Ag/ITO | 1000 |

The following beneficial effects can be obtained by applying the embodiments of the present disclosure.

The wiring space can be saved and the technical purpose of the narrow frame can be achieved since this embodiment provides a plurality of first touch test switches, second touch test switches, first data test switches and second data test switches in the non-display region, wherein the first touch test switches and the second touch test switches share the same first test control gate line, the first data test switches and the second data test switches share the same second test control gate line, the first touch test switches and the first data test switches share the same first test signal line, the second touch test switches and the second data test switches share the same second test signal line. In addition, the above structure can also reduce the input signals and reduce the power consumption.

The above is only some embodiments of the present disclosure. It should be noted that, for those skilled in the art, without departing away from the principle of the present disclosure, various modifications and ornaments may be made to the above embodiments, and such modifications and ornaments should be regarded as being within the protection scope of the present disclosure.

What is claimed is:

1. A touch display panel, including a base substrate, a plurality of first touch electrodes, a plurality of second touch electrodes, a plurality of first leads, a plurality of second leads, a plurality of first data lines and a plurality of second data lines located above the base substrate, wherein each of the first leads is connected to one of the first touch electrodes, each of the second leads is connected to one of the second touch electrodes, the base substrate includes a display region and a non-display region, wherein the touch display panel further includes: a plurality of first touch test switches, a plurality of second touch test switches, a first test signal line, a second test signal line, one or two test control gate lines, a plurality of first data test switches, and a plurality of second data test switches located in the non-display region;

wherein the first leads and the first data lines share the first test signal line, the second leads and the second data lines share the second test signal line;

the first touch test switches for controlling the first leads and the first data test switches for controlling the first data lines are not simultaneously turned on, the second touch test switches for controlling the second leads and the second data test switches for controlling the second data lines are not simultaneously turned on;

wherein the touch display panel includes two test control gate lines, the two test control gate lines include a first test control gate line and a second test control gate line;

a first terminal of the first touch test switch is electrically connected to the first lead, a second terminal of the first touch test switch is electrically connected to the first test signal line, and a control terminal of the first touch test switch is electrically connected to the first test control gate line;

a first terminal of the second touch test switch is electrically connected to the second lead, a second terminal of the second touch test switch is electrically connected to the second test signal line, and a control terminal of the second touch test switch is electrically connected to the first test control gate line;

a first terminal of the first data test switch is electrically connected to the first data line, a second terminal of the first data test switch is electrically connected to the first test signal line, and a control terminal of the first data test switch is electrically connected to the second test control gate line;

a first terminal of the second data test switch is electrically connected to the second data line, a second terminal of the second data test switch is electrically connected to the second test signal line, and a control terminal of the second data test switch is electrically connected to the second test control gate line; and the first touch electrodes and the second touch electrodes are alternately arranged along a first direction, and the first touch electrodes and the second touch electrodes are further alternately arranged along a second direction perpendicular to the first direction.

2. The touch display panel according to claim 1, wherein the display region includes a plurality of common electrodes arranged in blocks, and a plurality of sub-pixel units arranged in an array, wherein each of the sub-pixel unit includes a thin film transistor;

the first touch electrodes share a portion of the common electrodes, and the second touch electrodes share the remaining of the common electrodes.

3. The touch display panel according to claim 1, wherein gates of the first touch test switches, the second touch test switches, the first data test switches and the second data test switches are located on the same layer as a gate of the thin film transistor;

sources of the first touch test switches, the second touch test switches, the first data test switches and the second data test switches are located on the same layer as a source of the thin film transistor;

drains of the first touch test switches, the second touch test switches, the first data test switches, and the second data test switches are located on the same layer as a drain of the thin film transistor.

4. A display device, including the touch display panel according to claim 1.

5. A touch display panel, including a base substrate, a plurality of first touch electrodes, a plurality of second touch electrodes, a plurality of first leads, a plurality of second leads, a plurality of first data lines and a plurality of second data lines located above the base substrate, wherein each of the first leads is connected to one of the first touch electrodes, each of the second leads is connected to one of the second touch electrodes, the base substrate includes a display region and a non-display region, wherein the touch display panel further includes: a plurality of first touch test switches, a plurality of second touch test switches, a first test signal line, a second test signal line, one or two test control gate lines, a plurality of first data test switches, and a plurality of second data test switches located in the non-display region;

wherein the first leads and the first data lines share the first test signal line, the second leads and the second data lines share the second test signal line;

the first touch test switches for controlling the first leads and the first data test switches for controlling the first data lines are not simultaneously turned on, the second touch test switches for controlling the second leads and the second data test switches for controlling the second data lines are not simultaneously turned on, wherein the touch display panel includes one test control gate line;

a first terminal of the first touch test switch is electrically connected to the first lead, a second terminal of the first touch test switch is electrically connected to the first test signal line, and a control terminal of the first touch test switch is electrically connected to the test control gate line;

a first terminal of the second touch test switch is electrically connected to the second lead, a second terminal of the second touch test switch is electrically connected to the second test signal line, and a control terminal of the second touch test switch is electrically connected to the test control gate line;

a first terminal of the first data test switch is electrically connected to the first data line, a second terminal of the first data test switch is electrically connected to the first test signal line, and a control terminal of the first data test switch is electrically connected to the test control gate line;

a first terminal of the second data test switch is electrically connected to the second data line, a second terminal of the second data test switch is electrically connected to the second test signal line, and a control terminal of the second data test switch is electrically connected to the test control gate line;

when the first touch test switch and the second touch test switch are turned on under the control of the test control gate line, the first data test switch and the second data test switch are turned off under the control of the control gate line; or when the first touch test switch and the second touch test switch are turned off under the control of the test control gate line, the first data test switch and the second data test switch are turned on under the control of the control gate line.

6. The touch display panel according to claim 5, wherein the first touch test switch and the second touch test switch are N-type thin film transistors, and the first data test switch and the second data test switch are P-type thin film transistors; or the first touch test switch and the second touch test switch are P-type thin film transistors, and the first data test switch and the second data test switch are N-type thin film transistors.

7. The touch display panel according to claim 5, wherein the display panel further includes: a plurality of first auxiliary touch test switches, a plurality of second auxiliary touch test switches, an auxiliary test control gate line, a plurality of first auxiliary data test switches, and a plurality of second auxiliary data test switches, wherein the control terminals of the first auxiliary touch test switch, the second auxiliary touch test switch, the first auxiliary data test switch, and the second auxiliary data test switch are electrically connected to the auxiliary test control gate line;

the first auxiliary touch test switch is connected in series with the first touch test switch, a first terminal of the series-connected first auxiliary touch test switch and the first touch test switch is electrically connected to the first lead, and a second terminal of the series-connected first auxiliary touch test switch and the first touch test switch is electrically connected to the first test signal line;

the second auxiliary touch test switch is connected in series with the second touch test switch, a first terminal of the series-connected second auxiliary touch test switch and the second touch test switch is electrically connected to the second lead, and a second terminal of the series-connected second auxiliary touch test switch and the second touch test switch is electrically connected to the second test signal line;

the first auxiliary data test switch is connected in series with the first data test switch, a first terminal of the series-connected first auxiliary data test switch and the first data test switch is electrically connected to the first data line, and a second terminal of the series-connected first auxiliary data test switch and the first data test switch is electrically connected to the first test signal line;

the second auxiliary data test switch is connected in series with the second data test switch, a first terminal of the series-connected second auxiliary data test switch and the second data test switch is electrically connected to the second data line, and a second terminal of the series-connected second auxiliary data test switch and the second data test switch is electrically connected to the second test signal line.

8. The touch display panel according to claim 5, wherein the first touch electrodes and the second touch electrodes are alternately arranged along a first direction, and the first touch electrodes and the second touch electrodes are further alternately arranged along a second direction perpendicular to the first direction.

9. The touch display panel according to claim 8, wherein the display region includes a plurality of common electrodes arranged in blocks, and a plurality of sub-pixel units arranged in an array, wherein each of the sub-pixel unit includes a thin film transistor;

the first touch electrodes share a portion of the common electrodes, and the second touch electrodes share the remaining of the common electrodes.

10. The touch display panel according to claim 9, wherein gates of the first touch test switches, the second touch test switches, the first data test switches and the second data test switches are located on the same layer as a gate of the thin film transistor;

sources of the first touch test switches, the second touch test switches, the first data test switches and the second data test switches are located on the same layer as a source of the thin film transistor;

drains of the first touch test switches, the second touch test switches, the first data test switches, and the second data test switches are located on the same layer as a drain of the thin film transistor.

11. A display device, including the touch display panel according to claim 5.

\* \* \* \* \*